(No Model.)
J. W. STOKOE.
HEAD BLOCK FOR SAW MILLS.
No. 254,513. Patented Mar. 7, 1882.
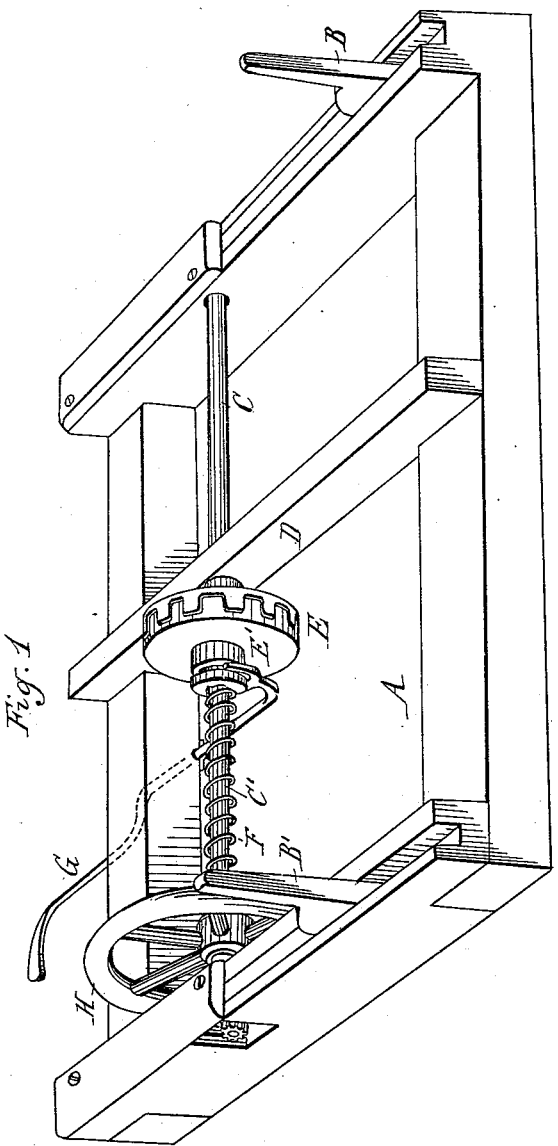
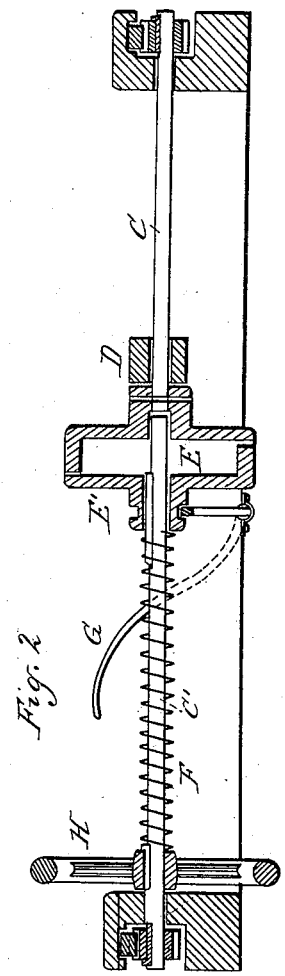
Attest:
A. Barthel
E. Scully
Inventor:
John W. Stokoe
per Thos. S. Sprague
Att'y

UNITED STATES PATENT OFFICE.

JOHN W. STOKOE, OF MANISTEE, MICHIGAN.

HEAD-BLOCK FOR SAW-MILLS.

SPECIFICATION forming part of Letters Patent No. 254,513, dated March 7, 1882.

Application filed October 12, 1881. (No model.)

*To all whom it may concern:*

Be it known that I, JOHN W. STOKOE, of Manistee, in the county of Manistee and State of Michigan, have invented an Improvement in Head-Blocks for Saw-Mills, of which the following is a specification.

The nature of this invention relates to certain new and useful improvements in head-blocks for carriages for circular-saw mills.

The object of the invention is to provide such carriages with a strong, durable, cheap, and simple device for the purpose of adjusting one of the knees forward or back in its relative position to the other, when required, by one end of the log being larger than the other, by means of which the best lumber is secured from the log, leaving the butt or taper thereof to be cut into shingles or small work.

Figure 1 is a perspective view of my improvement. Fig. 2 is a vertical central section through the axis of the shaft.

In the accompanying drawings, which form a part of this specification, A represents a carriage for a circular-saw mill, in which the knees B and B' may be simultaneously projected or retracted by means of a shaft, each end of which is provided with a pinion, which engages with a rack on the under side of each knee. This shaft is divided into two parts, the part C being journaled at one end in the end of the carriage, while its opposite end is supported in bearings in the cross-girt D, with an overhanging end, upon which is secured one half of the toothed clutch. The other part, C', of this shaft is journaled at one end in the opposite end of the carriage, while the opposite end is journaled in the hub of that half of the clutch E which is secured upon the other part, C, of the shaft. The other half, E', of the clutch is sleeved upon the part C' of this shaft, and is prevented from turning thereon by a slot in the hub of this part clutch and a feather on the shaft, in the usual manner of sleeving a part of a clutch upon a shaft so that the clutch will revolve with the shaft and have a reciprocating movement thereon. A spring, F, surrounds this part C' of the shaft to compel the engagement of the two parts of the clutch, except when forcibly released from such engagement by means of the lever G. A hand-wheel, H, enables the operator to rotate the shaft and set the knees as desired.

I am aware that it is not new to so construct the head-blocks of saw-mills that two knees may be moved separately or simultaneously, as may be desired, and therefore I do not broadly claim such invention.

What I claim as my invention is—

In a circular-saw-mill carriage, the two shafts C C', provided at their outer ends with gears for operating the knees, in combination with the clutch-section E E', the section E being rigidly secured to the shaft C and provided with an internal bearing for the inner end of the shaft C I, and the section E' constructed to slide on the shaft C', and the spring E and lever G, for sliding the clutch-section E' on its shaft, substantially as shown, and for the purpose specified.

JOHN W. STOKOE.

Witnesses:
N. W. NELSON,
E. E. DONVILLE.